(12) United States Patent
Sawai

(10) Patent No.: US 11,486,105 B2
(45) Date of Patent: Nov. 1, 2022

(54) HYDRAULIC DRIVING DEVICE OF SUCTION CAR

(71) Applicant: KATO WORKS CO., LTD., Tokyo (JP)

(72) Inventor: Shuji Sawai, Tokyo (JP)

(73) Assignee: KATO WORKS CO., LTD., Tokyo (JP)

( * ) Notice: Subject to any disclaimer, the term of this patent is extended or adjusted under 35 U.S.C. 154(b) by 276 days.

(21) Appl. No.: 17/034,298

(22) Filed: Sep. 28, 2020

(65) Prior Publication Data

US 2021/0229586 A1   Jul. 29, 2021

(30) Foreign Application Priority Data

Jan. 27, 2020  (JP) .............................. JP2020-010841

(51) Int. Cl.
| | |
|---|---|
| *B60K 17/10* | (2006.01) |
| *B60K 25/02* | (2006.01) |
| *B60P 1/60* | (2006.01) |
| *E01H 1/08* | (2006.01) |
| *B65G 53/24* | (2006.01) |
| *B60P 3/22* | (2006.01) |

(52) U.S. Cl.
CPC ........... *E01H 1/0836* (2013.01); *B60K 17/10* (2013.01); *B60K 2025/026* (2013.01); *B60P 1/60* (2013.01); *B60P 3/225* (2013.01); *B65G 53/24* (2013.01)

(58) Field of Classification Search
CPC ..... B60K 17/10; B60K 2025/026; B60P 1/60; E01H 1/0836
See application file for complete search history.

(56) References Cited

U.S. PATENT DOCUMENTS

| | | | | |
|---|---|---|---|---|
| 6,276,468 B1* | 8/2001 | Essig | ...................... | F16H 61/44 60/486 |
| 7,726,425 B2* | 6/2010 | Ishii | ...................... | B60K 17/10 180/53.4 |
| 2008/0314675 A1* | 12/2008 | Nozaki | ................. | F16H 61/456 180/305 |

FOREIGN PATENT DOCUMENTS

| | | |
|---|---|---|
| EP | 2 261 427 A1 | 12/2010 |
| JP | 59-9354 A | 1/1984 |
| JP | 05-322040 A | 12/1993 |
| JP | H06-58413 A | 3/1994 |
| JP | H11-141504 A | 5/1999 |

(Continued)

OTHER PUBLICATIONS

Japanese Office Action dated Aug. 3, 2021 received in 2020-010841.

*Primary Examiner* — Tinh Dang
(74) *Attorney, Agent, or Firm* — Scully, Scott, Murphy & Presser, P.C.

(57) ABSTRACT

A hydraulic driving device of a suction car includes a HST circuit, a suction actuator, a supply channel and a switching valve. In the HST circuit, a first connection channel and a second connection channel connect between a traveling drive pump and a traveling motor in a closed circuit. The suction actuator suction drives a suction device by being actuated by a hydraulic pressure. The switching valve allows oil discharged from the traveling drive pump to the first connection channel to be supplied to the traveling motor in a first operation state. The switching valve allows oil discharged from the traveling drive pump to the first connection channel to flow into the supply channel and be supplied to the suction actuator in a second operation state.

4 Claims, 3 Drawing Sheets

(56) References Cited

FOREIGN PATENT DOCUMENTS

| JP | 2010-286036 A | 12/2010 |
|---|---|---|
| JP | 2013-036237 A | 2/2013 |

\* cited by examiner

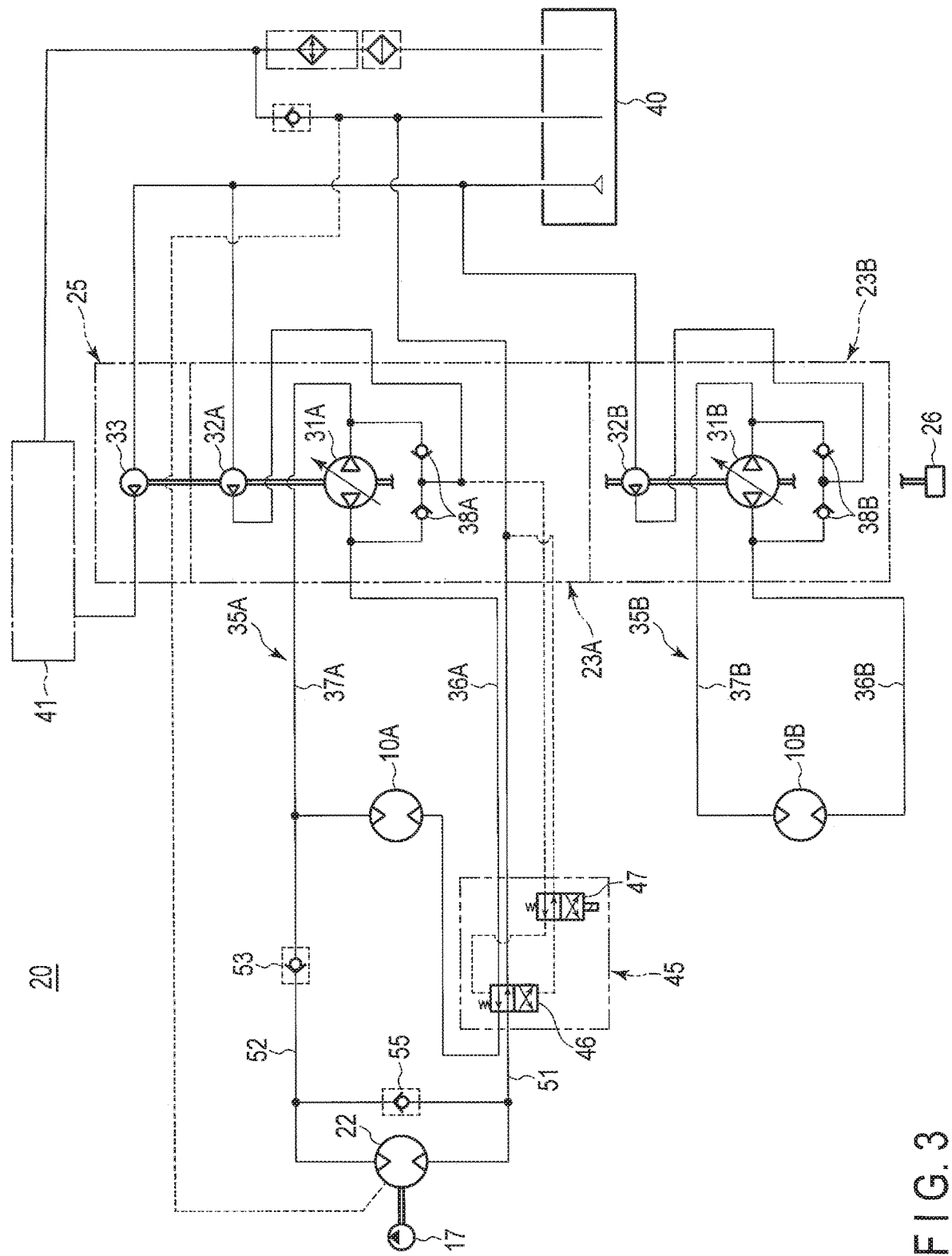
F I G. 3

HYDRAULIC DRIVING DEVICE OF SUCTION CAR

CROSS-REFERENCE TO RELATED APPLICATIONS

This application is based upon and claims the benefit of priority from Japanese Patent Application No. 2020-010841, filed Jan. 27, 2020; the entire contents of which are incorporated herein by reference.

BACKGROUND OF THE INVENTION

1. Field of the Invention

The present invention relates generally a hydraulic driving device provided in a suction car.

2. Description of the Related Art

In Jpn. Pat. Appln. KOKAI Publication No. 2013-36237, a suction car is disclosed. In this suction car, engine power is used to drive the suction car to travel. In addition, a suction device including a suction pump and a receiver tank (hopper) is mounted on the suction car. In the suction car, the suction pump is driven so that the pressure inside the receiver tank is reduced and a collection target outside the suction car is slicked into the receiver tank. Further, the suction car is provided with a hydraulic motor as a suction actuator, and the hydraulic motor is actuated with a hydraulic pressure so that the suction device is suction driven as described above. The suction car is also provided with a hydraulic pump that supplies oil (operating oil) to the hydraulic motor. The hydraulic pump is actuated by power that a power take-off (PTO) device takes from the engine.

BRIEF SUMMARY OF THE INVENTION

According to one aspect of the invention, a hydraulic driving device of a suction car, including: a first HST circuit including a first traveling motor, a first traveling drive pump, a first connection channel that connects between the first traveling drive pump and the first traveling motor, and a second connection channel that connects between the first traveling drive pump and the first traveling motor via a different route from the first connection channel and cooperates with the first connection channel to connect between the first traveling drive pump and the first traveling motor in a closed circuit; a suction actuator configured to suction drive a suction device by being actuated by a hydraulic pressure; a supply channel that supplies oil to the suction actuator; and a switching valve switchable to a first operation state and a second operation state, the switching valve allowing oil discharged from the first traveling drive pump to the first connection channel to be supplied to the first traveling motor in the first operation state and allowing oil discharged from the first traveling drive pump to the first connection channel to flow into the supply channel and be supplied to the suction actuator in the second operation state.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a schematic diagram showing a hydraulic circuit, etc. of a hydraulic driving device provided in the suction car according to the first embodiment.

DETAILED DESCRIPTION OF THE INVENTION

Hereinafter, an embodiment will be described with reference to the drawings.

First Embodiment

Figure 1:
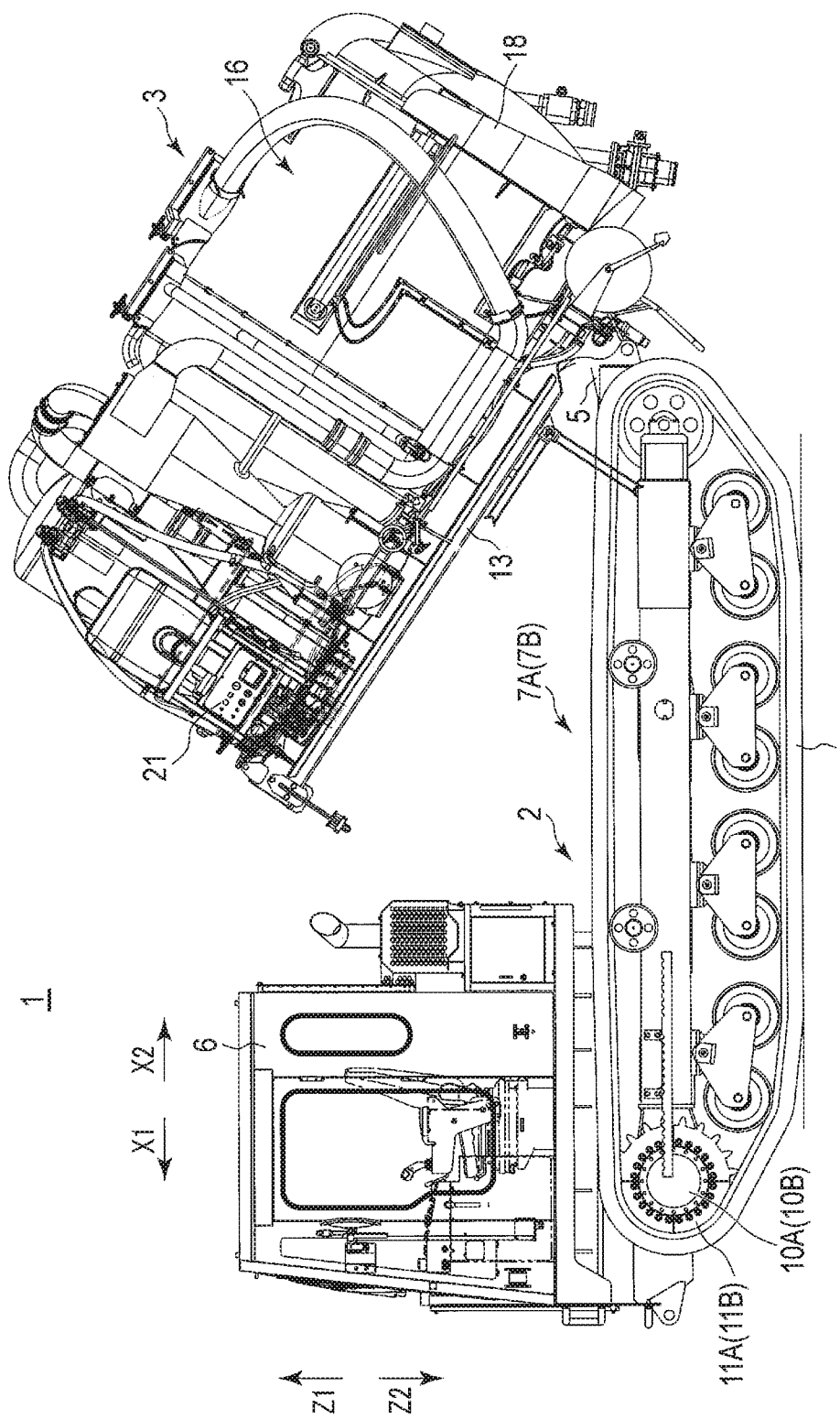
FIG. 1 is a side view showing a suction car according to a first embodiment.

FIG. 1 shows a suction car 1 according to a first embodiment. In the suction car 1, a front-rear direction (direction indicated by arrows X1 and X2) intersecting (perpendicular or approximately perpendicular to) a vertical direction (direction indicated by arrows Z1 and Z2), and a width direction intersecting (perpendicular or approximately perpendicular to) both the vertical direction and the front-rear direction, are defined. In FIG. 1, a direction perpendicular or approximately perpendicular to the paper surface coincides or approximately coincides with the width direction (left-right direction). In addition, in the suction car 1, one side (arrow X1 side) of the front-rear direction is a front side, and an opposite side (arrow X2 side) to the front side is a rear side.

The suction car 1 includes a traveling body 2 and a suction device 3. The suction device 3 is installed on the traveling body 2. The traveling body 2 includes a traveling frame 5, an operating room 6, and a pair of crawlers 7A and 7B. In the operating room 6, operations related to traveling are input by an operator, etc. The crawlers 7A and 7B are attached to the traveling frame 5, and are provided apart from each other in the width direction. For example, the crawler (first crawler) 7A is attached to a left side portion of the traveling frame 5, and the crawler (second crawler) 7B is attached to a right side portion of the traveling frame 5.

In addition, the traveling body 2 is provided with a pair of traveling motors 10A and 10B as a traveling actuator. Each of the traveling motors 10A and 10B is rotated when oil (operating oil) is supplied, i.e., by a hydraulic pressure. A belt 12A of the crawler 7A is attached to the traveling motor (first traveling motor) 10A via a sprocket 11A. Similarly, a belt 12B of the crawler 7B is attached to the traveling motor (second traveling motor) 10B via a sprocket 11B.

Each of the traveling motors 10A and 10B is rotatable in both of one direction and the other direction around its rotation axis. When the traveling motors 10A and 10B are simultaneously rotated in one direction around the rotation axis, the suction car 1 moves toward the rear side by respective movements of the belts 12A and 12B. Thereby, the traveling body 2 is driven to travel so that the suction car 1 moves backward. On the other hand, when the traveling motors 10A and 10B are simultaneously rotated in the other direction around the rotation axis, the suction car 1 moves toward the front side by respective movements of the belts 12A and 12B. Thereby, the traveling body 2 is driven to travel so that the suction car 1 moves forward.

In the suction car 1, a suction device frame 13 is connected to the traveling frame 5. The suction device frame 13 is arranged on a vertically upper side with respect to the traveling frame 5 and a rear side with respect to the operating room 6. The suction device 3 is installed on the suction device frame 13. Thus, the suction device 3 is arranged on a vertically upper side with respect to the traveling frame 5 and a rear side with respect to the operating room 6.

Figure 2:
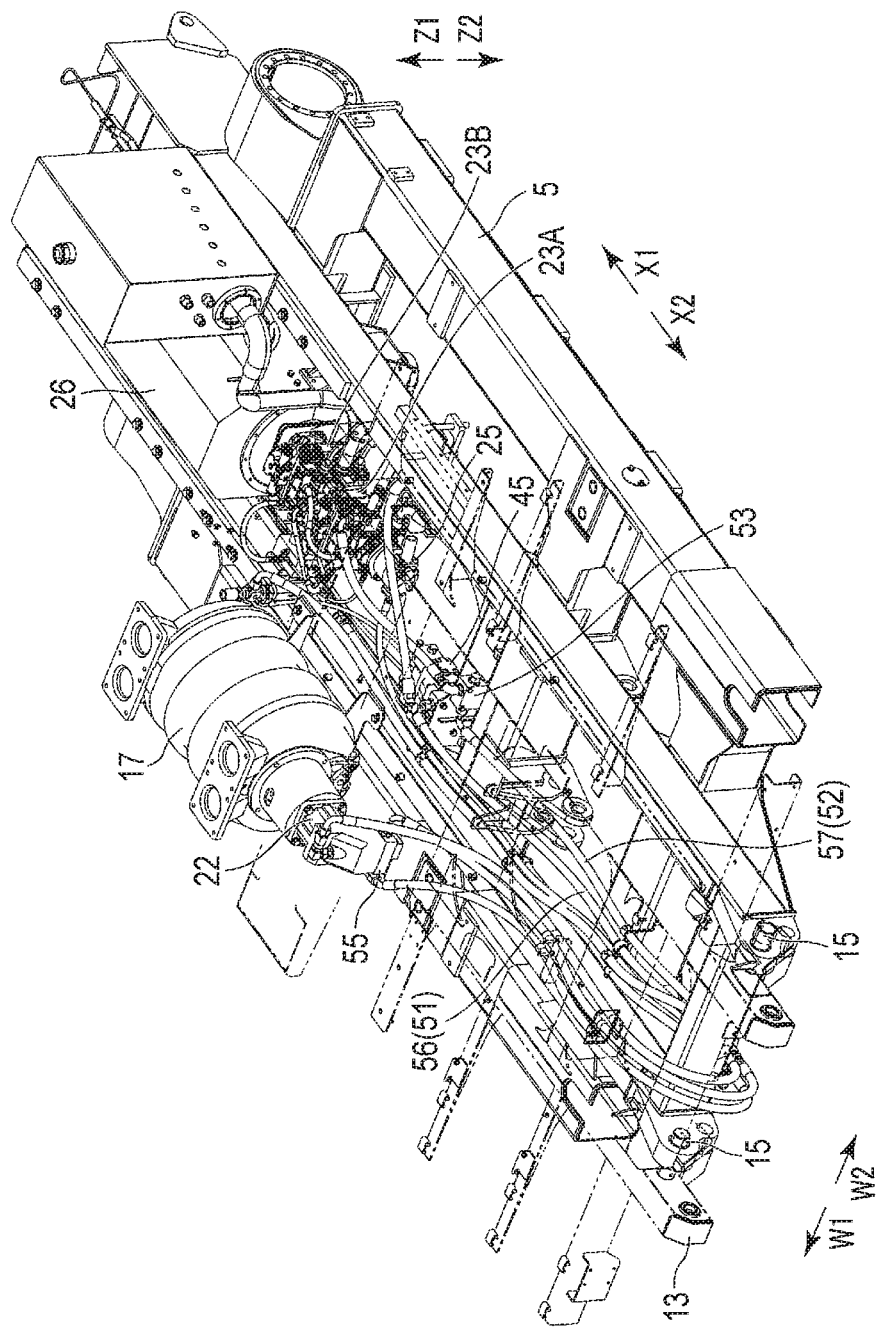
FIG. 2 is a perspective view showing a traveling frame, a suction device frame, and parts and devices, etc. installed thereon in the suction car of FIG. 1.

FIG. 2 shows the traveling frame 5, the suction device frame 13, and parts and devices, etc. installed thereon. In FIG. 2, a direction indicated by arrows W1 and W2 is a width direction. As shown in FIGS. 1 and 2, etc., in the suction car 1, a rear end portion of the suction device frame 13 is connected to a rear end portion of the traveling frame 5 via shafts 15. The suction device frame 13 is turnable relative to the traveling frame 5 around a connecting position to the traveling frame 5. The shaft 15 (a central axis of the shaft 15) extends along the width direction of the suction car 1, and a pivot axis of the suction device frame 13 relative to the traveling frame 5 is along the width direction of the suction car 1. In a state of FIG. 2, the suction device frame 13 is parallel or approximately parallel to the traveling frame 5. When turning relative to the traveling frame 5 from the state of FIG. 2, the suction device frame 13 is changed into a state of FIG. 1. In the state of FIG. 1, the suction device frame 13 inclines with respect to the traveling frame 5 in a state in which a front side portion of the suction device frame 13 is located on a vertically upper side.

In addition, the suction device 3 includes a hopper 16, and a blower 17, which is a suction driving source. The hopper 16 and the blower 17 are installed on the suction device frame 13. In the suction device 3, when the blower 17 is driven, the pressure inside the hopper 16 is reduced, and a collection target outside the suction car 1 is sucked into the hopper 16. That is, the suction device 3 is suction driven by the blower 17 being driven. The collection target that is sucked and collected is deposited inside the hopper 16.

An openable/closable door 18 is provided at a rear end portion of the hopper 16. An actuator (e.g., a door cylinder) that opens and closes the door 18 is provided in the suction device 3. The hopper 16 is turnable relative to the suction device frame 13. By the turning relative to the suction device frame 13, the hopper 16 is changed from a state of being parallel or approximately parallel to the suction device frame 13 to a state of inclining with respect to the suction device frame 13. In a state in which the hopper 16 inclines with respect to the suction device frame 13, a front side portion in the hopper 16 is located on a vertically upper side. In addition, an actuator (e.g., a dump cylinder) that turns (tilts) the hopper 16 relative to the suction device frame 13 is provided in the suction device 3.

When discarding the collection target deposited in the hopper 16 at a waste disposal site, etc., the hopper 16 is turned relative to the suction device frame 13 so that the hopper 16 is inclined with respect to the suction device frame 13 as described above. Then, the door 18 is opened to discard the collection target inside the hopper 16. The suction device 3 is also provided with a lock mechanism, that locks the door 18 in a closed state. By the lock mechanism, the door 18 is maintained in the closed state.

Also, an actuator (e.g., a chuck cylinder) that actuates the lock mechanism is provided in the suction device 3.

The above-described actuator that opens and closes the door 18, actuator that turns the hopper 16, and actuator that actuates the lock mechanism are unloading actuators used for unloading of the collection target. Each of the unloading actuators is actuated when oil (operating oil) is supplied, i.e., by a hydraulic pressure. In addition, an operation device 21 is installed in the suction device frame 13. In the operation device 21, operations associated with the suction device 3 such as operations related to the suction drive of the suction device 3 are input by the operator, etc. In an example of FIGS. 1 and 2, etc., the operation device 21 is located on a front side with respect to the suction device 3.

Further, a blower driving motor 22 is installed in the suction device frame 13, as a suction actuator. In an example of FIGS. 1 and 2, etc., the blower 17 and blower driving motor 22 are arranged between the hopper 16 and the operation device 21 in the front-rear direction. The blower driving motor 22 is directly connected to the blower 17 from the rear side of the suction car 1. The blower driving motor 22 is rotated when oil (operating oil) is supplied, i.e., by a hydraulic pressure. When the blower driving motor 22 is rotated, i.e., when the blower driving motor 22 is actuated, the blower 17 is driven, and the suction device 3 is suction driven as described above. Note that the blower driving motor 22 is rotatable only in one direction around its rotation axis, and is not rotated in the other direction around the rotation axis.

In the suction car 1, a hydraulic driving device 20 that drives the above-described traveling motors 10A and 10B, blower driving motor (suction actuator) 22, and unloading actuators is mounted. FIG. 3 shows a hydraulic circuit, etc. of the hydraulic driving device 20. As shown in FIGS. 2 and 3, the hydraulic driving device 20 includes a pair of traveling pump blocks 23A and 23B and an unloading pump block 25.

An engine 26 is installed in the traveling frame 5. The engine 26 is arranged on a front side with respect to the suction device 3 including the blower 17 and the blower driving motor 22. In an example of FIG. 2, etc., the traveling pump blocks 23A and 23B and unloading pump block 25 are directly connected to the engine 26 from the rear side. The traveling pump block 23B, traveling pump block 23A, and unloading pump block 25 are arranged continuously in this order from a side close to the engine 26, i.e., from the front side. Thus, a pump block row in which the three pump blocks are arranged continuously is directly connected to the rear side of the engine 26.

A traveling drive pump (first traveling drive pump) 31A and a charge pump (first charge pump) 32A are incorporated into the traveling pump block (first traveling pump block) 23A, and a traveling drive pump (second traveling drive pump) 31B and a charge pump (second charge pump) 32B are incorporated into the traveling pump block (second traveling pump block) 23B. An unloading pump 33 is incorporated into the unloading pump block 25. Each of the traveling drive pumps 31A and 31B, charge pumps 32A and 32B, and unloading pump 33 is actuated by power from the engine 26.

In the hydraulic circuit of the hydraulic driving device 20, an HST (Hydro-Static Transmission) circuit 35A is formed between the traveling drive pump 31A and a traveling motor 10A. In the HST circuit (first HST circuit) 35A, a connection channel (first connection channel) 36A connects between the traveling drive pump 31A and the traveling motor 10A, and a connection channel (second connection channel) 37A connects between the traveling drive pump 31A and the traveling motor 10A via a different route from the connection channel 36A. In the HST circuit 35A, the connection channels 36A and 37A cooperate to connect between the traveling drive pump 31A and the traveling motor 10A in a closed circuit.

The traveling drive pump 31A is capable of discharging oil (operating oil) to both of the connection channels 36A and 37A. When oil is supplied to the traveling motor 10A from the traveling drive pump 31A through the connection channel 36A, the traveling motor 10A rotates in one direction around its rotation axis. At this time, the oil flows into the traveling drive pump 31A from the traveling motor 10A through the connection channel 37A. On the other hand, when the oil is supplied to the traveling motor 10A from the traveling drive pump 31A through the connection channel 37A, the traveling motor 10A rotates in the other direction around the rotation axis. At this time, the oil flows into the traveling drive pump 31A from the traveling motor 10A through the connection channel 36A.

To which one of the connection channels 36A and 37A the oil is discharged from the traveling drive pump 31A changes corresponding to a tilt angle of the traveling drive pump 31A. In addition, the traveling drive pump 31A is a variable capacity pump in which a discharge quantity changes corresponding to a tilt angle. The tilt angle of the traveling drive pump 31A is adjusted by an operation of the operator, etc. in the operating room 6.

The charge pump 32A, when actuated, discharges oil (operating oil) stored in an oil reservoir 40. The oil discharged from the charge pump 32A is supplied to the HST circuit 35A, and an oil quantity of the HST circuit 35A is complemented by the oil from the charge pump 32A. The oil from the charge pump 32A can flow into both of the connection channels 36A and 37A. In addition, backflow of the oil of the charge pump 32A from the HST circuit 35A is prevented by backflow preventing valves 38A.

In the hydraulic circuit of the hydraulic driving device 20, an HST circuit 35B is also formed between the traveling drive pump 31B and a traveling motor 10B. In the HST circuit (second HST circuit) 35B, a connection channel (third connection channel) 36B connects between the traveling drive pump 31B and the traveling motor 10B, and a connection channel (fourth connection channel) 37B connects between the traveling drive pump 31B and the traveling motor 10B via a different route from the connection channel 36B. In the HST circuit 35B, the connection channels 36B and 37B cooperate to connect between the traveling drive pump 31B and the traveling motor 10B in a closed circuit.

The traveling drive pump 31B is capable of discharging oil (operating oil) to both of the connection channels 36B and 37B. When oil is supplied to the traveling motor 10B from the traveling drive pump 31B through the connection channel 36B, the traveling motor 10B rotates in one direction around its rotation axis. At this time, the oil flows into the traveling drive pump 31B from the traveling motor 10B through the connection channel 37B. On the other hand, when oil is supplied to the traveling motor 10B from the traveling drive pump 31B through the connection channel 37B, the traveling motor 10B rotates in the other direction around the rotation axis. At this time, the oil flows into the traveling drive pump 31B from the traveling motor 10B through the connection channel 36B.

To which one of the connection channels 36B and 37B the oil is discharged from the traveling drive pump 31B changes corresponding to a tilt angle of the traveling drive pump 31B. The traveling drive pump 31B as well as the traveling drive pump 31A are variable capacity pumps in which a discharge quantity changes corresponding to a tilt angle. The tilt angle of the traveling drive pump 31B is adjusted by an operation of the operator, etc. in the operating room 6.

The charge pump 32B, when actuated, discharges oil (operating oil) stored in the oil reservoir 40. The oil discharged from the charge pump 32B is supplied to the HST circuit 35B, and an oil quantity of the HST circuit 35B is complemented by the oil from the charge pump 32B. The oil from the charge pump 32B can flow into both of the connection channels 36B and 37B. In addition, backflow of the oil of the charge pump 32B from the HST circuit 35B is prevented by backflow preventing valves 38B.

In FIG. 3, a reference sign 41 indicates the above-described unloading actuators and unloading switching valves that switch a supply of oil (operating oil) to the unloading actuators. Oil discharged from the unloading pump 33 is supplied to each of the unloading actuators through the unloading switching valve, etc. Oil flows out from each of the unloading actuators to the oil reservoir 40.

Herein, when supplying the oil to the traveling motor 10B from the traveling drive pump 31B through the connection channel 36B at the same time as supplying the oil to the traveling motor 10A from the traveling drive pump 31A through the connection channel 36A, the traveling body 2 is driven to travel so that the suction car 1 moves backward. When supplying the oil to the traveling motor 10B from the traveling drive pump 31B through the connection channel 37B at the same time as supplying the oil to the traveling motor 10A from the traveling drive pump 31A through the connection channel 37A, the traveling body 2 is driven to travel so that the suction car 1 moves forward.

Each of the traveling drive pumps 31A and 31B is a variable capacity pump. In contrast, each of the charge pumps 32A and 32B and unloading pump 33 is a non-variable capacity pump, and discharges oil, for example, in a rated discharge quantity. Thus, in each of the traveling drive pumps 31A and 31B, by adjusting the tilt angle, it is possible to discharge oil in a significantly larger discharge quantity than those of the charge pumps 32A and 32B and unloading pump 33. The discharge quantity of the oil from each of the traveling drive pumps 31A and 31B, charge pumps 32A and 32B, and unloading pump 33 changes corresponding to the rotation speed of the engine 26.

In addition, a switching valve (traveling/suction switching valve) 45 is provided in the hydraulic driving device 20. In an example of FIG. 3, etc., the switching valve 45 is formed of a hydraulic valve 46 and an electromagnetic valve 47. In addition, a supply channel 51 through which oil supplied to the blower driving motor (suction actuator) 22 from the switching valve 45 passes, and an outflow channel 52 through which oil flowing out from the blower driving motor 22 passes, are formed in the hydraulic driving device 20. The outflow channel 52 is connected to the connection channel 37A of the HST circuit 35A via a backflow preventing check valve 53.

In the suction car 1, the switching valve 45 and the backflow preventing check valve 53 are installed in the traveling frame 5. The switching valve 45 and the backflow preventing check valve 53 are connected via piping. Each of the switching valve 45 and the backflow preventing check valve 53 is located on the rear side of the suction car 1 with respect to each of the engine 26, traveling pump blocks 23A and 23B (traveling drive pumps 31A and 31B), and unloading pump block 25 (unloading pump 33).

In addition, a cavitation preventing check valve 55 is provided in the hydraulic driving device 20. At the time of stopping and deceleration, etc. of the blower driving motor 22, the blower driving motor 22 may rotate due to inertia of the blower 17. At this time, generation of cavitation in the blower driving motor 22 is prevented by the cavitation preventing check valve 55. The cavitation preventing check valve 55 is directly connected to the blower driving motor 22 from the rear side of the suction car 1. Thus, the cavitation preventing check valve 55 is connected to the blower 17 via the blower driving motor 22. The cavitation preventing check valve 55 is installed in the suction device frame 13 together with the blower driving motor 22 and blower 17.

Each of the blower driving motor 22 and the cavitation preventing check valve 55 is located on the rear side of the suction car 1 with respect to each of the engine 26, traveling pump blocks 23A and 23B (traveling drive pumps 31A and 31B), and unloading pump block 25 (unloading pump 33). In addition, each of the blower driving motor 22 and the cavitation preventing check valve 55 is located of a vertically upper side with respect to each of the engine 26, traveling pump blocks 23A and 23B, unloading pump block 25, switching valve 45, and backflow preventing check valve 53.

To the blower driving motor 22, oil (operating oil) is supplied only from the supply channel 51, and is not supplied from the outflow channel 52. In the hydraulic driving device 20, by the backflow preventing check valve 53, flow of oil in the outflow channel 52 from the connection channel of the HST circuit 35A is prevented, and backflow of oil in the supply channel 51 and the outflow channel 52 is prevented. Thus, the blower driving motor 22 is rotated only in one direction around the rotation axis, and is not rotated in the other direction around the rotation axis. In addition, since generation of cavitation in the blower driving motor 22 is prevented by the cavitation preventing check valve 55, the blower driving motor 22 is prevented from being damaged due to cavitation.

By the switching valve 45, a communication state between the connection channel (first connection channel) 36A and the supply channel 51 is switched. The switching valve 45 is switchable between a first operation state and a second operation state. In the first operation state, electric power is not supplied to the electromagnetic valve 47. On the other hand, in the second operation state, electric power is supplied to the electromagnetic valve 47, and a supply state of pilot oil to the hydraulic valve 46 changes from the first operation state.

In the first operation state of the switching valve 45, there is no communication between the connection channel 36A and the supply channel 51 at the switching valve 45. Thus, oil discharged from the traveling drive pump 31A to the connection channel 35A is supplied from the switching valve 45 to the traveling motor 10A. Thereby, the traveling motor 10A rotates in such a direction as to cause the traveling body 2 to move back. In the first operation state of the switching valve 45, the supply channel 51 to the blower driving motor 22 communicates with the oil reservoir 40 via a channel.

In the second operation state of the switching valve 45, a portion of the connection channel 36A on the traveling drive pump 31A side from the switching valve 45 communicates with the supply channel 51. Thereby, oil discharged from the traveling drive pump 31A to the connection channel 36A flows into the supply channel 51 at the switching valve 45. Then, the oil flowing into the supply channel 51 from the traveling drive pump 31A is supplied to the blower driving motor (suction actuator) 22. Thereby, the blower driving motor 22 and the blower 17 are driven, and the suction device 3 is suction driven. In the second operation state of the switching valve 45, a portion of the connection channel 36A on the traveling motor 10A side from the switching valve 45 communicates with the oil reservoir 40 via a channel.

As shown in FIG. 2, etc., in the suction car 1, the supply channel 51 between the switching valve 45 and the blower driving motor 22 is formed by piping 56, etc. Then, the outflow channel 52 between the backflow preventing check valve 53 and the blower driving motor 22 is formed by piping 57, etc. The piping 56 (supply channel 51) extends from the switching valve 45 toward the rear side of the suction car 1 along the traveling frame 5, and the piping 57 (outflow channel 52) extends from the backflow preventing check valve 53 toward the rear side of the suction car 1 along the traveling frame 5. Then, each of the pipings 56 and 57 is folded back at a rear end portion of the traveling frame 5, i.e., in the vicinity of the pivot axis of the suction device frame 13 relative to the traveling frame 5. Then, each of the pipings 56 and 57 extends toward the front side of the suction car 1 from the folding position to the blower driving motor 22 along the suction device frame 13.

Since the piping 56 extends as described above, the supply channel 51 extends between the switching valve 45 and the blower driving motor (suction actuator) 22 in a state of being folded back at the rear end portion of the traveling frame 5. Thus, the piping 56 is U-shaped or approximately U-shaped as viewed from the width direction of the suction car 1. Since the piping 57 extends as described above, the outflow channel 52 extends between the backflow preventing check valve 53 and the blower driving motor (suction actuator) 22 in a state of being folded back at the rear end portion of the traveling frame 5. Thus, the piping 57 is U-shaped or approximately U-shaped as viewed from the width direction of the suction car 1.

Hereinafter, operations and advantageous effects of the hydraulic driving device 20 and the suction car 1 having the above-described configurations will be described. The suction drive of the suction device 3 is performed in a state in which the traveling drive of the traveling body 2 is stopped. Thus, when suction driving the suction device 3, the suction car 1 is stopped at a site. In a case where a large quantity of oil (operating oil) is required in particular to actuate the blower driving motor 22, the engine 26 is stopped after stopping the suction car 1, and a parking brake incorporated into the traveling motor 10A, etc. is actuated. Thereby, the blower driving motor 22 is prevented from rotating in reverse due to a back pressure of the outflow channel 52.

The operator then switches the mode to a suction mode by an operation at the operation device 21, etc., and starts the engine 26. Thereby, the oil is supplied from the traveling drive pump 31A to the blower driving motor 22 through the connection channel 36A, switching valve 45, and supply channel 51, as described above, and the blower driving motor 22 is actuated. In the suction mode, the operator, etc. adjusts the rotation speed of the engine 26 and the tilt angle of the traveling drive pump 31A by an operation at the operation device 21, etc. Thereby, a discharge quantity of the oil from the traveling drive pump 31A to the connection channel 36A is adjusted, and a supply quantity of the oil to the blower driving motor 2 is adjusted.

In the present embodiment, the switching valve 45 and the supply channel 51 are provided so that oil discharged from the traveling drive pump 31A can be supplied to the blower driving motor 22, which is a suction actuator. That is, the traveling drive pump 31A that supplies oil to the traveling motor 10A, which is a different actuator from the suction actuator, can be shared for supplying oil to the blower driving motor 22.

Since a dedicated hydraulic pump for supplying oil to the blower driving motor 22 need not be provided, it possible to increase a space occupied by the hopper 16 on the suction device frame 13. Thereby, the inner volume of the hopper 16 increases so that a deposition amount of the collection target to the hopper 16 can be increased.

In addition, in the present embodiment, the configuration that enables oil supply from the traveling drive pump 31A to the blower driving motor 22 as described above can be realized by adding the switching valve 45, supply channel 51, outflow channel 52, backflow preventing check valve 53, and cavitation preventing check valve 55 to the HST circuit 35A including the traveling drive pump 31A and the traveling motor 10A. Thus, the configuration that enables oil supply from the traveling drive pump 31A to the blower driving motor 22 can be realized using the HST circuit 35A with almost no addition of channels or parts.

In addition, the traveling drive pump 31A is a variable capacity pump in which a discharge quantity changes corresponding to a tilt angle. Thus, the above-described configuration that enables oil supply from the traveling drive pump 31A to the blower driving motor 22 applies to blowers 17 of various capacities. For example, even in a case where a large quantity of oil (operating oil) is required to actuate the blower driving motor 22, the configuration that enables oil supply from the traveling drive pump 31A to the blower driving motor 22 is applicable. The tilt angle of the traveling drive pump 31A is adjustable corresponding to the quantity of oil required to actuate the blower driving motor (suction actuator) 22 so that a supply quantity of oil from the traveling drive pump 31A to the blower driving motor 22 is adjustable.

In addition, when the switching valve 45 switches from the second operation state to the first operation state, a state in which oil is supplied from the traveling drive pump 31A to the blower driving motor 22 switches to a state in which oil is supplied from the traveling drive pump 31A to the traveling motor 10A. Then, when the switching valve 45 switches from the second operation state to the first operation state, oil of the HST circuit 35A is complemented by the charge pump 32A. Thus, switching from the suction drive of the suction device 3 to the traveling drive of the traveling body 2 can be performed quickly.

Furthermore, when performing maintenance on the traveling pump blocks 23A and 23B, unloading pump block 25, switching valve 45, etc., the operator, etc. turns the suction device frame 13 relative to the traveling frame 5 so that the suction device frame 13 inclines with respect to the traveling frame 5. In the present embodiment, the supply channel 51 (piping 56) extends from the switching valve 45 to the blower driving motor (suction actuator) 22 in a state of being folded back at the rear end portion of the traveling frame 5, and the outflow channel 52 (piping 57) extends from the backflow preventing check valve 53 to the blower driving motor (suction actuator) 22 in a state of being folded back at the rear end portion of the traveling frame 5. Thus, the turning of the suction device frame 13 relative to the traveling frame 5 is not interrupted by the supply channel 51 and the outflow channel 52. Thereby, maintenance of the traveling pump blocks 23A and 23B, unloading pump block 25, switching valve 45, etc. can be easily performed.

Modification

In the above-described embodiment, etc., the blower 17 is provided as a suction driving source, but a suction pump, etc. may be used as a suction driving source. Similarly, the suction actuator is not limited to the blower driving motor 22, and, for example, a hydraulic motor that drives a suction pump, etc. may be used. That is, the hydraulic driving device 20 of the above-described embodiment, etc. is applicable to a configuration in which a suction actuator actuated by supply of oil (operating oil) is provided and the suction device 3 is suction driven by the suction actuator being actuated.

In the above-described embodiment, the traveling motors 10A and 10B are rotated so that the belts 12A and 12B of the crawlers 7A and 7B move and the traveling body 2 is driven to travel, but it is not limited thereto. For example, a pair of wheels may be provided instead of the crawlers 7A and 7B. In this case, by each of the traveling motors 10A and 10B being rotated, a corresponding one of the pair of wheels is rotated. Then, the traveling body 2 is driven to travel by both of the pair of wheels being rotated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hydraulic driving device of a suction car, comprising:
a first HST circuit including a first traveling motor, a first traveling drive pump, a first connection channel that connects between the first traveling drive pump and the first traveling motor, and a second connection channel that connects between the first traveling drive pump and the first traveling motor via a different route from the first connection channel and cooperates with the first connection channel to connect between the first traveling drive pump and the first traveling motor in a closed circuit;
a suction actuator configured to suction drive a suction device by being actuated by a hydraulic pressure;
a supply channel that supplies oil to the suction actuator; and
a switching valve switchable to a first operation state and a second operation state, the switching valve allowing oil discharged from the first traveling drive pump to the first connection channel to be supplied to the first traveling motor in the first operation state and allowing oil discharged from the first traveling drive pump to the first connection channel to flow into the supply channel and be supplied to the suction actuator in the second operation state.

2. The hydraulic driving device according to claim 1, wherein
the first traveling drive pump is directly connected to an engine installed in a traveling frame,
the switching valve and the suction actuator are located on a rear side of the suction car with respect to the first traveling drive pump, and
the actuator is located on a vertically upper side with respect to the first traveling drive pump and the switching valve.

3. The hydraulic driving device according to claim 2, wherein
the switching valve is installed in the traveling frame,
the suction actuator is installed in a suction device frame connected to a rear end portion of the traveling frame in a turnable manner relative to the traveling frame, and the supply channel extends between the switching valve and the suction actuator in a state of being folded back at the rear end portion of the traveling frame.

4. The hydraulic driving device according to claim 1, further comprising a second HST circuit including a second traveling motor, a second traveling drive pump, a third connection channel that connects between the second traveling drive pump and the second traveling motor, and a fourth connection channel that connects between the second traveling drive pump and the second traveling motor via a different route from the third connection channel and cooperates with the third connection channel to connect between the second traveling drive pump and the second traveling motor in a closed circuit.

\* \* \* \* \*